US008384580B2

(12) United States Patent
Witkowski et al.

(10) Patent No.: US 8,384,580 B2
(45) Date of Patent: Feb. 26, 2013

(54) SYSTEM AND METHOD FOR EXTENDING TRANSMITTER TRAINING WINDOW

(75) Inventors: Todd R. Witkowski, Zeeland, MI (US); Steven L. Geerlings, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 686 days.

(21) Appl. No.: 12/519,730

(22) PCT Filed: Dec. 17, 2007

(86) PCT No.: PCT/US2007/025742
§ 371 (c)(1), (2), (4) Date: Nov. 4, 2009

(87) PCT Pub. No.: WO2008/082482
PCT Pub. Date: Jul. 10, 2008

(65) Prior Publication Data

US 2010/0060505 A1 Mar. 11, 2010

Related U.S. Application Data

(60) Provisional application No. 60/876,232, filed on Dec. 21, 2006.

(51) Int. Cl.
*H04L 17/02* (2006.01)

(52) U.S. Cl. ..... 341/176; 340/5.25; 340/5.26; 340/5.61; 340/5.64

(58) Field of Classification Search .................. 341/176; 340/5.7, 5.61, 3.21, 5.62, 825.92, 825.72
See application file for complete search history.

(56) References Cited

U.S. PATENT DOCUMENTS

| | | | | |
|---|---|---|---|---|
| 5,969,637 | A * | 10/1999 | Doppelt et al. | 340/12.55 |
| 6,081,203 | A * | 6/2000 | Fitzgibbon | 340/12.23 |
| 6,091,343 | A * | 7/2000 | Dykema et al. | 340/13.21 |
| 6,703,941 | B1 * | 3/2004 | Blaker | 340/12.28 |
| 7,183,940 | B2 * | 2/2007 | Chuey | 340/12.23 |
| 7,786,843 | B2 * | 8/2010 | Witkowski | 340/5.25 |
| 2003/0033540 | A1 * | 2/2003 | Fitzgibbon | 713/200 |
| 2004/0130442 | A1 * | 7/2004 | Breed et al. | 340/443 |
| 2004/0155792 | A1 * | 8/2004 | Joyner et al. | 340/825.69 |
| 2005/0026604 | A1 * | 2/2005 | Christenson et al. | 455/419 |
| 2006/0217850 | A1 * | 9/2006 | Geerlings et al. | 701/2 |
| 2006/0232377 | A1 * | 10/2006 | Witkowski | 340/5.25 |
| 2010/0159846 | A1 * | 6/2010 | Witkowski et al. | 455/70 |

FOREIGN PATENT DOCUMENTS

| | | | |
|---|---|---|---|
| GB | 2404478 | B | 10/2005 |
| WO | WO 2008/082482 | A2 | 7/2008 |

OTHER PUBLICATIONS

International Search Report and Written Opinion for International Application No. PCT/US2007/025742, mail date Jul. 3, 2008, 9 pages.

* cited by examiner

*Primary Examiner* — Linh Nguyen
(74) *Attorney, Agent, or Firm* — Foley & Lardner LLP

(57) ABSTRACT

A method for configuring a transmitter device to transmit a recognized transmission to a receiving device is provided. The method includes transmitting a first transmission and transmitting a second transmission after the first transmission. The method further includes receiving, during the second transmission, a user input signal from an interface for receiving signals from one or more user interface elements. The method further includes storing an attribute associated with the second transmission in a memory device in response to the user input signal.

9 Claims, 14 Drawing Sheets

SYSTEM AND METHOD FOR EXTENDING TRANSMITTER TRAINING WINDOW

CROSS REFERENCE TO RELATED APPLICATIONS

The present application claims the benefit of International Application No. PCT/US2007/025742 filed Dec. 17, 2007, which claims the benefit of U.S. Provisional Patent Application No. 60/876,232 filed Dec. 21, 2006, the entire disclosures of which are incorporated by reference herein.

BACKGROUND

The present application relates generally to the field of vehicle control systems. The present application relates more specifically to systems and methods for providing a universal transmitter with an extended training window.

Devices that may be remotely controlled such as garage door openers are typically configured to receive one or more signals and to change status or actuate based on the received one or more signals.

By way of example, a receiving device such as a garage door opener typically includes a radio frequency (RF) receiver, signal processing hardware and/or software, and a motor to open or close the garage door. In order to trigger the receiving device (e.g., open or close the garage door), a user may use a transmitter configured to transmit an RF signal (or signals) expected by the receiving device. Once the receiving device receives the expected transmissions, the signal processing software and/or hardware direct the motor to open or close the garage door.

When a user purchases a garage door opener, an original transmitter is usually provided by the manufacturer of the garage door. It is often desirable for users to use universal transmitters in place of (or with) the original transmitter. These universal transmitters may be replacement handheld transmitters, transmitters integral with the user's vehicle, or transmitters that may be installed or embedded into a vehicle. For example, it may be desirable for vehicle manufacturers to provide built-in transmitters to vehicle purchasers that users may conveniently access from within the vehicle. Some vehicles include buttons for such transmitters built into an overhead device, built into a visor, and/or built into any other part of the vehicle. Universal transmitters may be programmed to operate with a garage door opener system regardless of the make or model of the garage door opener system. Universal transmitters may be available for purchase as do-it-yourself aftermarket devices a user may install into their vehicle.

Universal transmitters may be programmed in a variety of ways. For example, some universal transmitters may be programmed or "trained" by reading signals sent from an original transmitter. Other universal transmitters may be trained by "trying" a variety of frequencies, codes, modulation schemes, or combinations thereof to determine which transmissions activate a receiving device (e.g., garage door opener). These universal transmitters may be trained by entering a "training mode" where the transmitter will sequentially try a variety of signal possibilities stored within the transmitter until the signal that will activate the receiver is determined.

In training mode, the universal transmitters that try various possibilities during training may output multiple code patterns (e.g., multiple rolling and/or billion code data formats) in a sequential fashion. During training the user is instructed to release a button (or to press a button) being trained when the user observes the desired receiving device respond (e.g., garage door opener, gate opener, security system, home devices such as lights, etc.). The universal transmitter is trained or configured properly as long as the user releases the button before the universal transmitter has moved on to the next data sequence. In other words, if the user released the button during the data sequence that caused the receiving device to actuate, the universal transmitter will correlate the data sequence to the desired button. Often, however, a code may be repeated two or more times to allow the receiving device to confirm the signal and avoid a false positive. If the code is sent multiple times, the receiving device may not respond to the signal until it is sent multiple times. Delay (human and/or system) may cause the user to release the button at the incorrect time, and the universal transmitter may incorrectly correlate the button with the incorrect data sequence (i.e., the data sequence transmitted after the data sequence that actuated the receiving device, etc.).

This problem results because conventional systems contain "training windows," or button actuation (e.g., release, press, etc.) windows, with time lengths that match the data sequences transmitted. For example, just before conventional systems begin outputting the next data sequence to try, the window in which the user may release the button to select the previous data sequence is closed. In these conventional systems, this window is typically two to three seconds. The problem with this design is that the user may not release the button quickly enough to train properly. Delays between the receiving device visually changing status (e.g., door opening or closing) and the button being released that may cause the correct training window to be missed may be human, mechanical, and/or electrical. For example, a human delay might be caused by a delayed observation of the receiving device changing status or simply by a delayed physical release of the button after observation. An electrical or mechanical delay may be a delay in the activation of the garage door motor. Regardless of the source of the delay, if the user releases the button too late, conventional universal transmitters will typically store the wrong code. Providing the user with more time in which they may release the button may increase the probability of a successful train and user satisfaction with the product.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a system for mounting in a vehicle including a user interface element and for causing a receiver device to change states. The system includes a transmitter, a memory unit, and an interface for receiving a user feedback signal from the user interface element. The system is configured to cause the transmitter to transmit a first transmission followed by a second transmission. The system is further configured to associate a first user feedback time window with the first transmission and a second user feedback time window with the second transmission, the first user feedback time window extending to a time after the transmitter has begun transmitting the second transmission. The system is further configured to associate the user feedback signal with the first transmission when the user feedback signal is received during the first user feedback window. The system is yet further configured to associate the user feedback signal with the second transmission when the user feedback signal is received during the second user feedback window. The system is configured to store a representation and/or an attribute of the first transmission or the second transmission in the memory based on which transmission has been associated with the user feedback signal.

Another embodiment relates to a method for configuring a transmitter device to transmit a recognized transmission to a receiving device, the method comprising: transmitting a first transmission; transmitting a second transmission after the first transmission; receiving, during the second transmission, a user input signal from an interface for receiving signals from one or more user interface elements; storing an attribute associated with the second transmission in a memory device in response to the user input signal.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Applicants have discovered that providing the user with more time in which they may provide user interface feedback during training will increase the probability of a successful train.

Applicants have discovered that a training window (e.g., button actuation window, button press window, button release window), may be extended by not closing the window as soon as the next data sequence begins outputting. A button release or training window may remain open until some time during the next transmission to the receiving device.

Some receivers require receiving a second and sometimes a third data message before the receiver triggers the device they are controlling. For these systems, the applicants have discovered that a training window for a first transmission may remain open until the second or third message of the next transmission is sent from the transmitter device. Such a configuration may add a significant amount of time to the training window, increasing the likelihood that the user will successfully train their transmitter device. Since many receiver devices, such as many “rolling code” or “billion code” receivers, require receiving or “seeing” a second and sometimes a third message before they will change state (e.g., before they will move a garage door), the window for the previous data format may stay open until just before the second or third message for the next transmission is transmitted by the transmitter device.

A transmitter device (e.g., universal transmitter, trainable transmitter, etc.) with an extended training window may be implemented entirely in software, partially in hardware and partially in software, or entirely in hardware. For example, a circuit, such as a logic circuit, an application specific integrated circuit (ASIC), a field programmable gate array (FPGA), a microcontroller and/or processor (e.g., executing software) may control the output of transmissions and the timing of the training windows. The processor may be configured with logic so that when the processor detects that the user has released the button being trained before the transmitter device has completed transmitting the next transmission (or enough of the next transmission) that would cause the receiving device to change state, the processor would assume the user had released the button in response to the previous transmission, and configure the transmitter accordingly.

A transmitter device with an extended training window may be configured to work with a variety of in-vehicle control systems and may be installed in any number of vehicle types.

Figure 1:
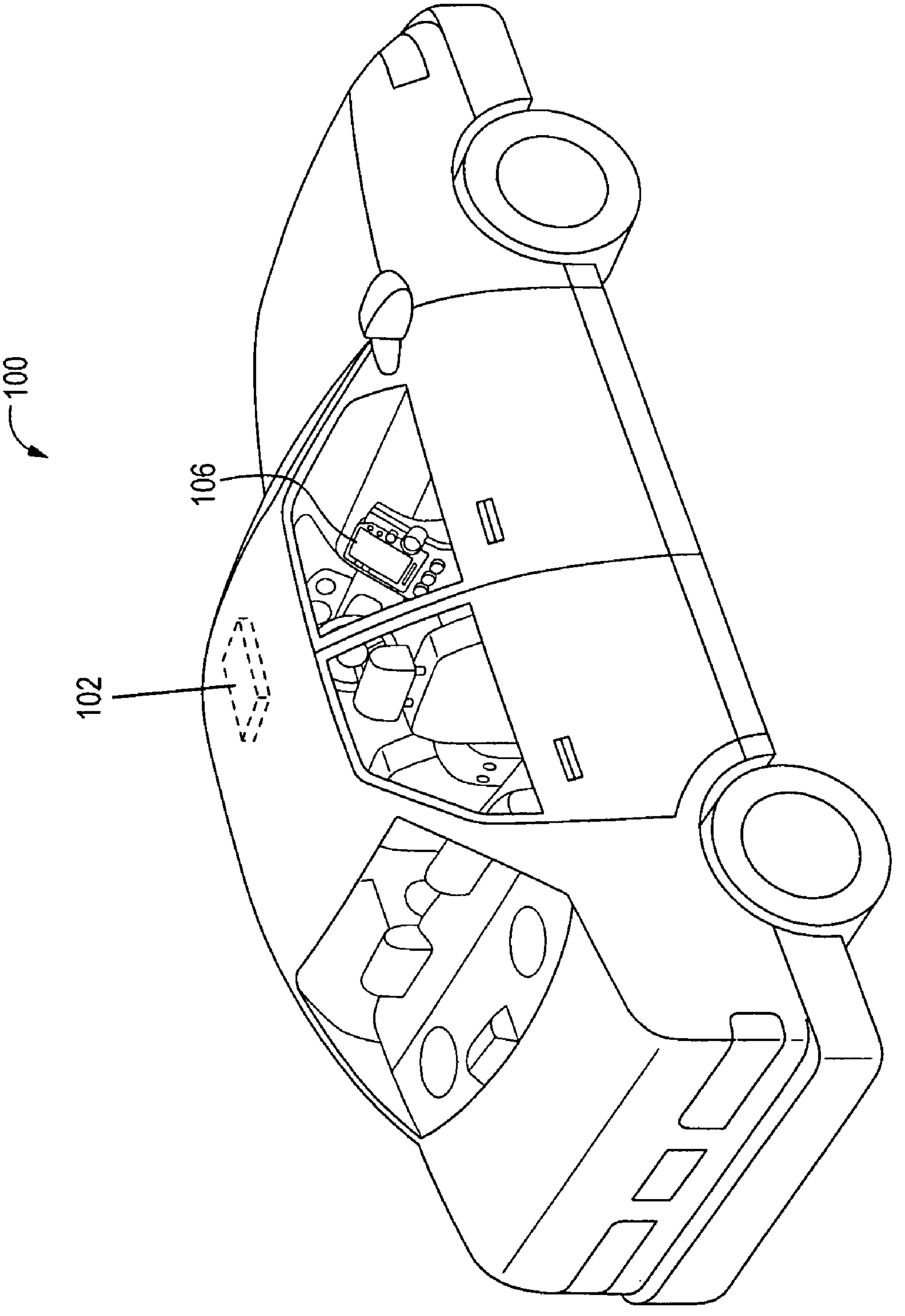
FIG. 1 is a perspective view of a motor vehicle that includes an in-vehicle control system and transmitter, according to an exemplary embodiment.

Referring to FIG. 1, an exemplary vehicle 100 that transmitter device 102 may be installed in or mounted to is shown. Vehicle 100 may include a number of subsystems for user convenience and entertainment. A vehicle generally includes a heating, ventilation, and air-conditioning (HVAC) system, a sound system, and an in-vehicle control system 106 (e.g., media system, navigational system, entertainment system, display system, communications systems, etc.). The HVAC system, sound system, display systems, and communications systems may be coupled to in-vehicle control system 106, which is capable of controlling and monitoring a variety of systems, automatically or by a manual user command. It is noted that in various exemplary embodiments, vehicle 100, the HVAC system, the sound system, and other vehicle systems may be of any past, present, or future design capable of interacting with in-vehicle control system 106.

Figure 2:
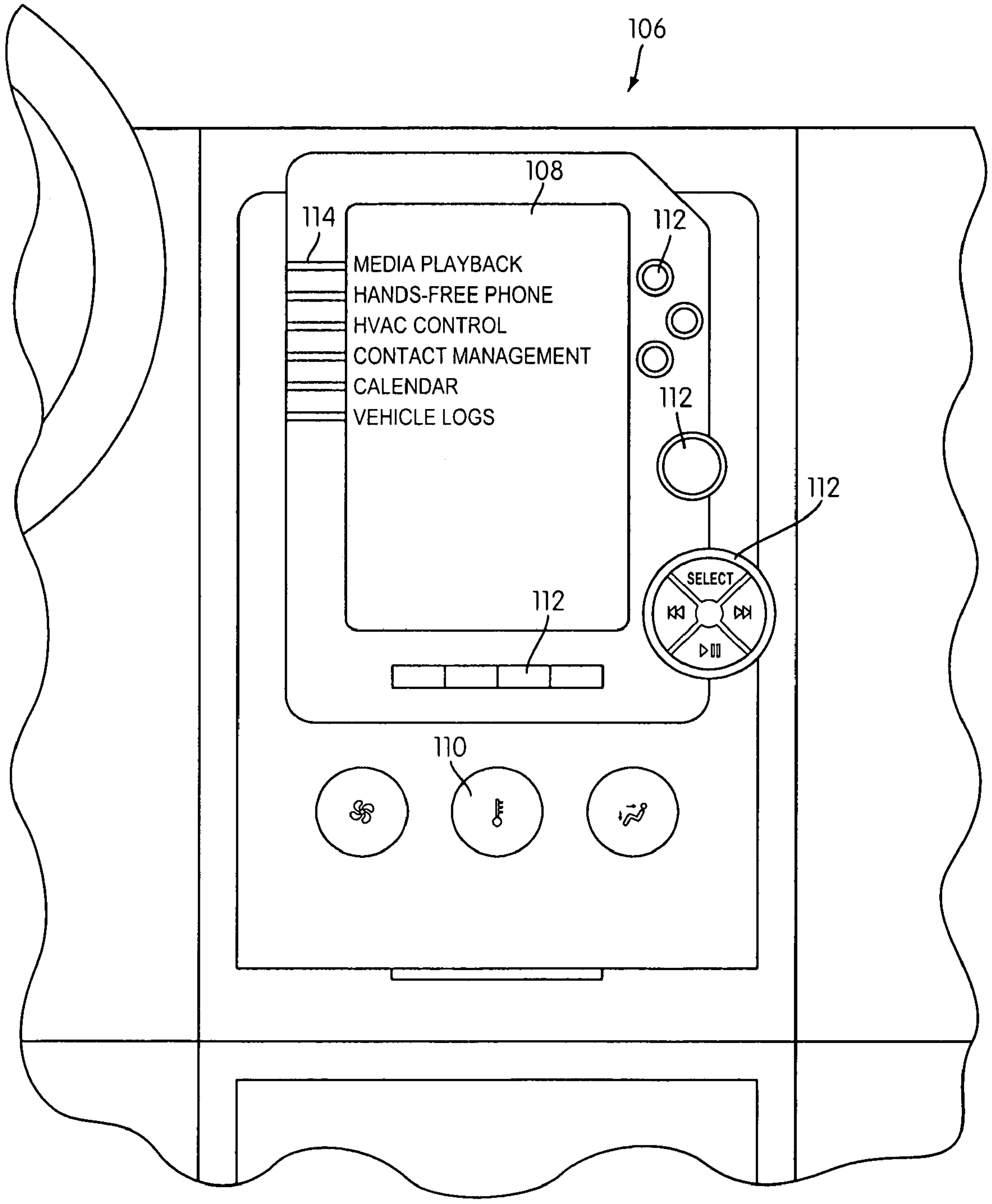
FIG. 2 is a front elevation view of the user interface of the in-vehicle control system of FIG. 1, according to an exemplary embodiment.

Referring to FIG. 2, one exemplary embodiment of in-vehicle control system 106 is shown. In-vehicle control system 106 generally includes output display 108, one or more knobs 110, one or more pushbuttons 112, and one or more tactile user inputs or pushbuttons 114, which facilitate controlling various vehicle, media, and/or transmitter functions. According to an exemplary embodiment, in-vehicle control system 106 and its components (e.g., input components, output components, user interface components, etc.) may be used to control the transmitter device. The transmitter device and/or various components of the transmitter device may be integrated into in-vehicle control system 106. For example, the transmitter device may use a processor, a memory, an interface with a vehicle data bus, a power input, any input device, any output device, etc. of in-vehicle control system 106 to accomplish a transmitter device function. The input devices, touch screen, user interface, menus, and any other input or output device(s) of in-vehicle control system 106 may be used during normal transmitter operation (e.g., when the transmitter is not primarily being trained or configured) and/or training operation.

Figure 3:
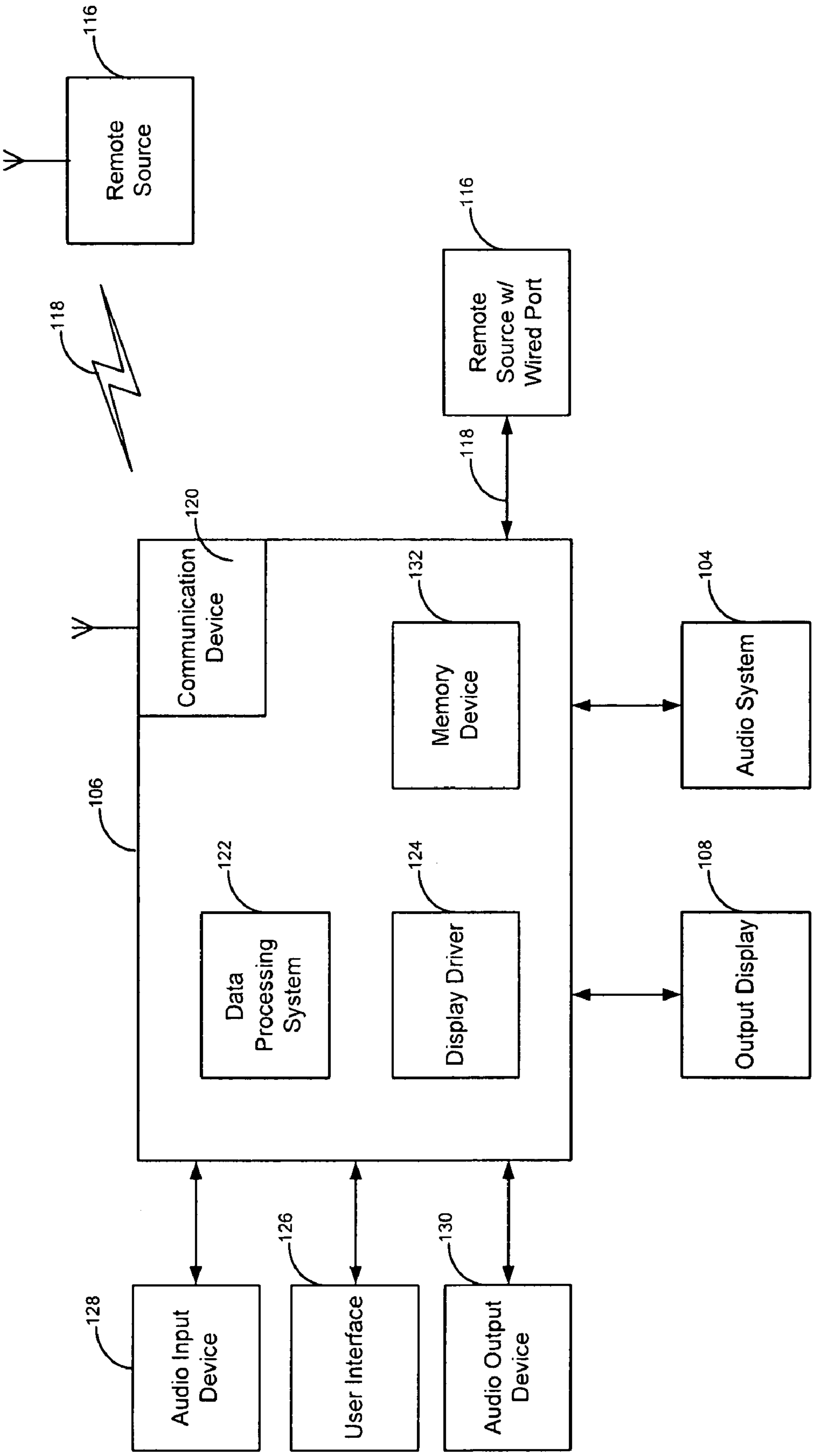
FIG. 3 is a block diagram of the in-vehicle control system of FIG. 1 that includes various components, according to an exemplary embodiment.

Referring to FIG. 3, in-vehicle control system 106 is capable of accessing data files from (or conducting other data communication with) a remote source 116 over a communication link 118 (either via a wired or wireless connection). In-vehicle control system 106 may generally include a communication device 120, a data processing system 122, a display driver 124, a user interface 126, an audio input device 128, an audio output device 130, an output display 108, an audio system 104, and a memory device 132.

Figure 4:
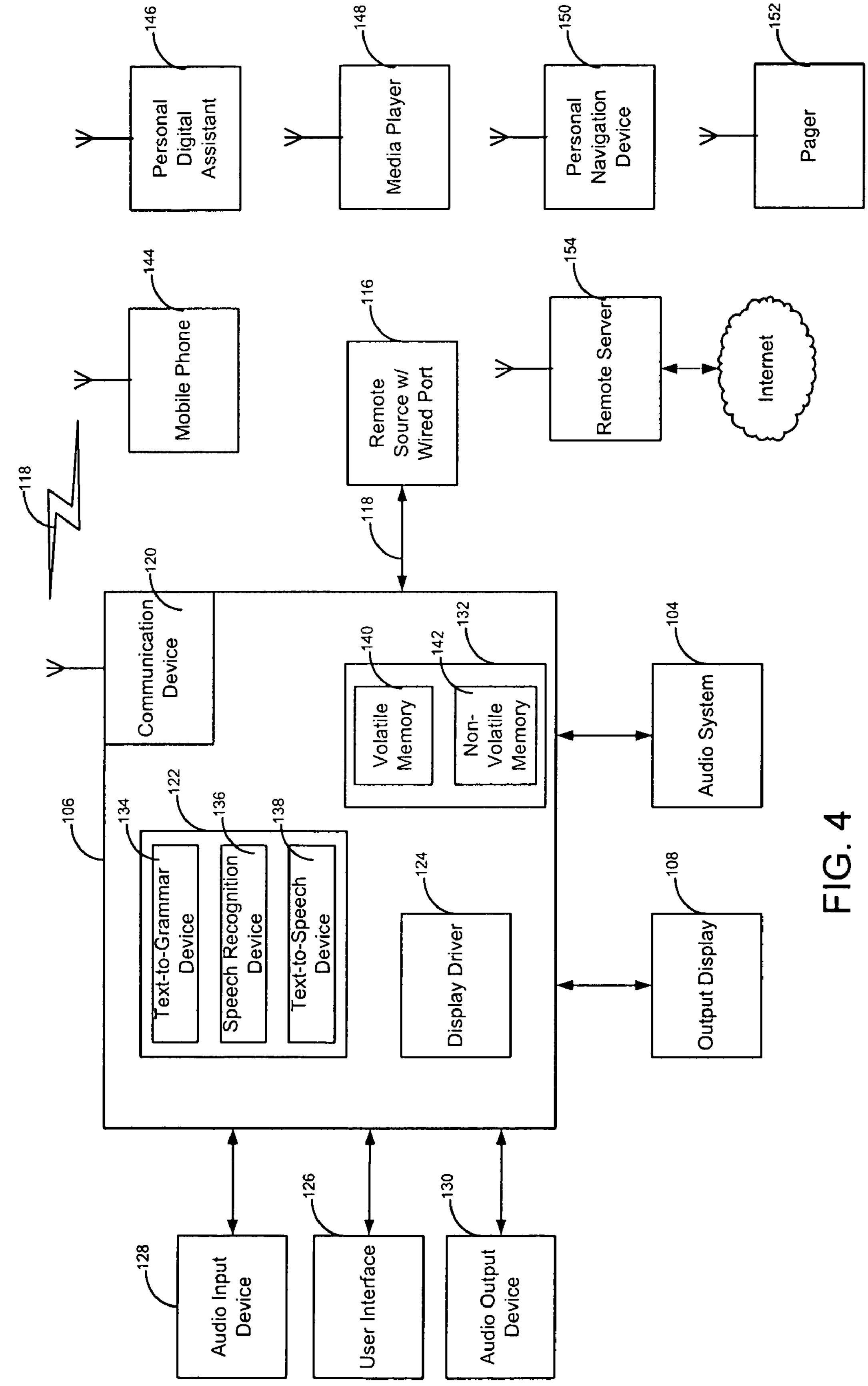
FIG. 4 is a more detailed embodiment of the in-vehicle control system of FIG. 3, according to an exemplary embodiment.

Referring to FIG. 4, in-vehicle control system 106 and remote source 116 are shown in greater detail. Data processing system 122 may generally include a text-to-grammar device 134, a speech recognition device 136, and a text-to-speech device 138. Data processing system 122 may include any number of additional hardware modules, software modules, or processing devices (e.g., additional graphics processors, communications processors, etc.). Speech recognition device 136 of in-vehicle control system 106 may be used to control the transmitter device during training and/or during normal operation. Memory device 132 may include either or both of volatile memory 140 or non-volatile memory 142. A remote source may be a mobile phone 144, personal digital assistant (PDA) 146, media player 148, personal navigation device 150, pager 152, remote server 154 coupled to an internet, or any other remote source. Memory device 132 may be communicably connected to the processor. Memory device 132 may include computer code for facilitating, executing, controlling, and/or otherwise processing logical steps or processes relating to the activities herein described. The components of vehicle control system 106 may be configured for mounting to a vehicle, may be housed in a single unit or module, or may be distributed in/around vehicle 100.

Figure 5:
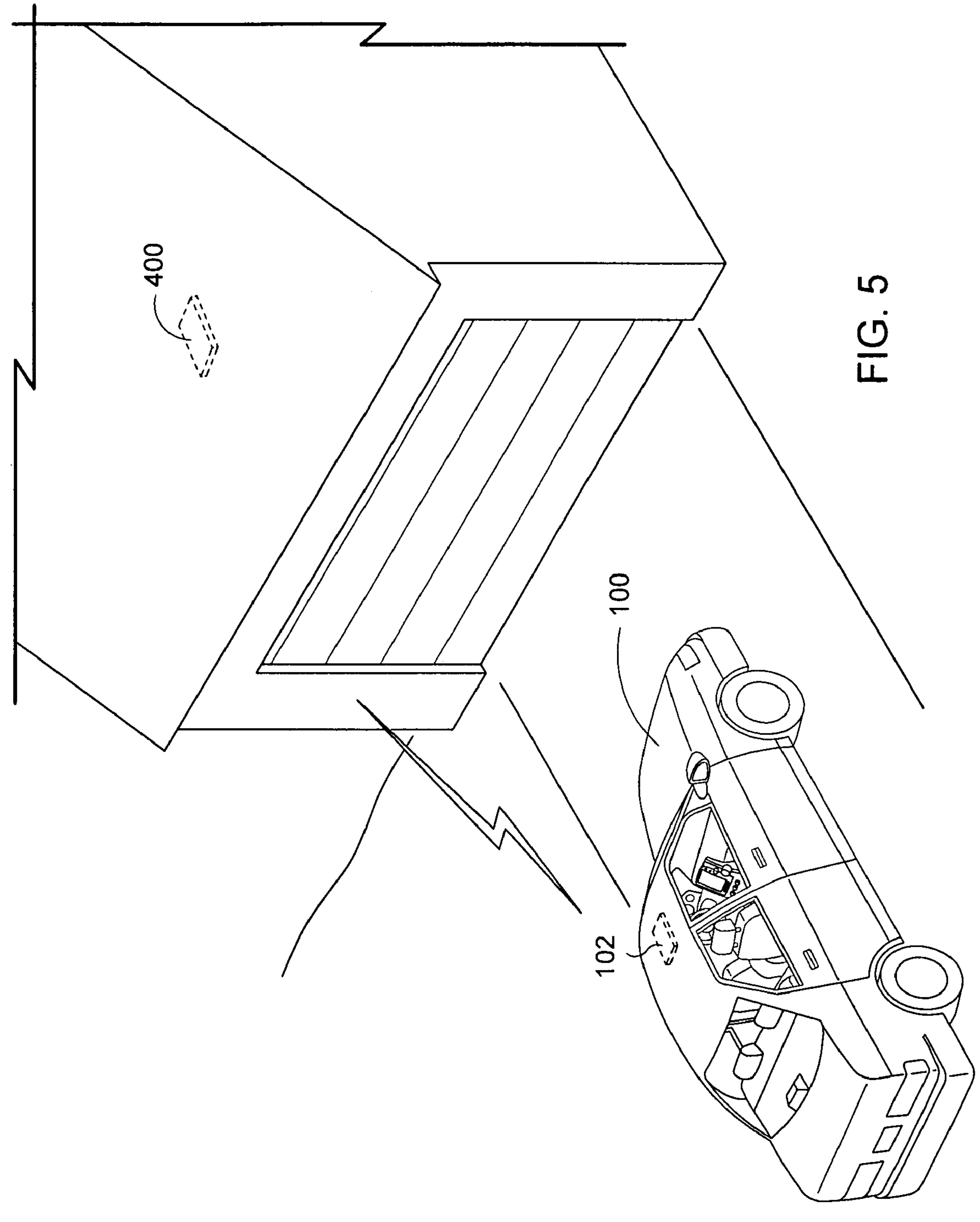
FIG. 5 is an environment view of the vehicle of FIG. 1, including a transmitter device, and a designated parking area such as a garage, including a receiver device, according to an exemplary embodiment.

Referring to FIG. 5, vehicle 100 is shown having a transmitter device 102 (e.g., universal transmitter, trainable transmitter, etc.). Transmitter device 102 may be configured for mounting to the vehicle. Transmitter 102 is shown in FIG. 5 as mounted to a vehicle ceiling location and is illustrated as sending a transmission (e.g., one or more signals, messages, codes, etc.) to a receiver device 400 (e.g., a garage door opener) from within vehicle 100. Transmitter device 102 may also be positioned anywhere in vehicle 100. Portions of the transmitter, for example, the antenna and RF-circuitry, may be located apart from the other portions of the transmitter device. The control or input devices of the transmitter device may be positioned within vehicle 100 somewhere within the driver's reach (and/or the reach of another vehicle occupant).

Receiver device 400 is shown as a garage door opener. According to other various embodiments, receiver device 400 may be configured for use with any residential and/or commercial receiver device (e.g., a lighting device, a security device, a gate, a parking structure, etc.). Receiving circuitry of receiver device 400 may be embedded into or otherwise integrally a part of the garage door opener or coupled to the garage door opener via a wired or wireless interface.

Figure 6A:
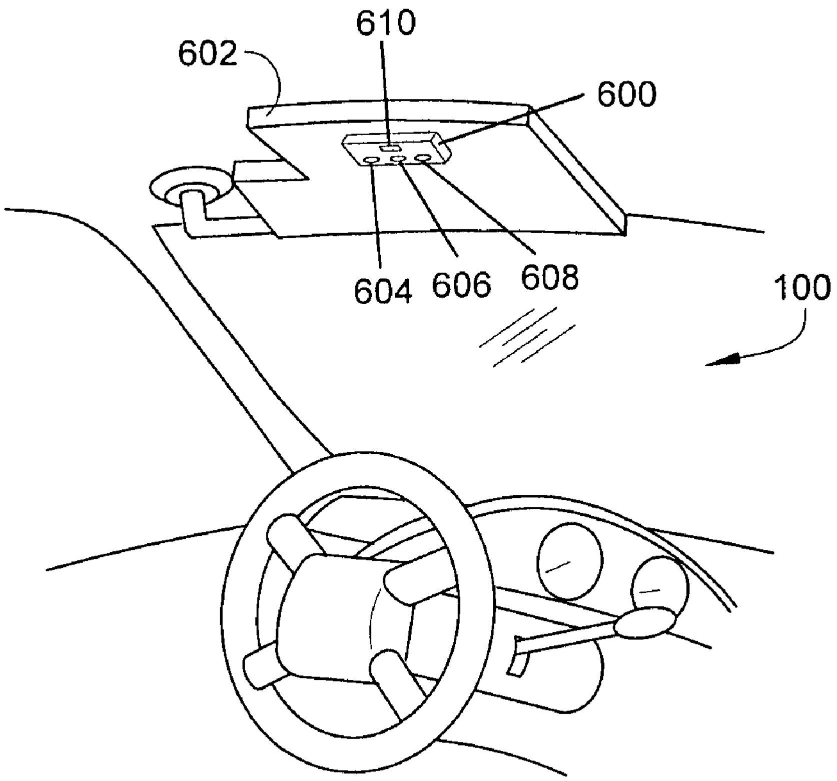
FIGS. 6A and 6B are views of at least the user control portion of the transmitter device of FIG. 5 installed in a vehicle, according to an exemplary embodiment.
Figure 6B:
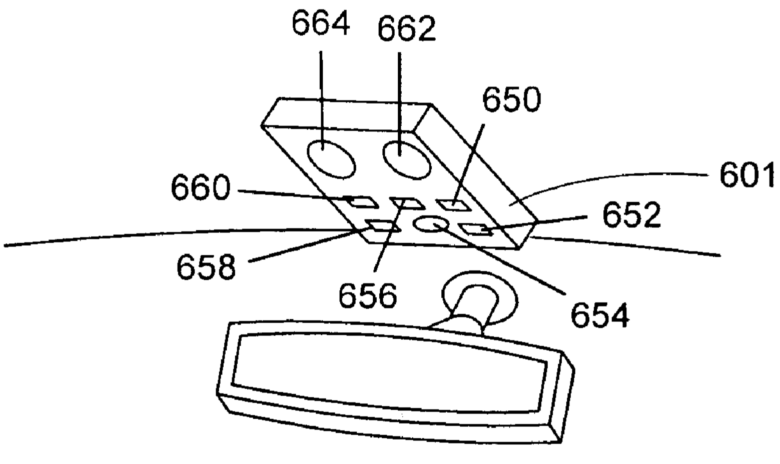

Referring to FIG. 6A, at least the user control portion 600 of a transmitter device is shown installed in a vehicle as mounted to a visor 602, according to an exemplary embodiment. The user control portion of trained transmitter 600 may house all of the circuitry of the transmitter, part of the circuitry, or might only house user buttons and/or other user interface elements. FIG. 6B illustrates a user control portion 601 of a transmitter installed at an overhead location within the vehicle, according to an exemplary embodiment. FIG. 6A displays the trained transmitter as having a user input array including three buttons 604, 606, 608. FIG. 6A also includes an indicator light 610 (e.g., an LED, etc.) used for visual user communication. For example, indicator light 610 may indicate a training mode and/or light up when a user has pressed a button. Transmitter device portion 601 shown in FIG. 6B is shown having user input buttons 650, 652, 654, 656, 658, 660, a microphone 662, and a speaker 664. Microphone 662 may be used to detect user commands. Speaker 664 may be used to give the user audio indication, instructions, commands, or feedback. For example, speaker 664 could use audio output of speech to direct the user through the training process. It is important to note that any user input device or devices can be used to train transmitter device 102. For example, transmitter device 102 might be programmed or trained via detecting a button press, detecting a button release, detecting a voice command, detecting one or more simultaneous button presses, detecting any combination or sequence of button presses, detecting touch screen input, detecting switch actuation, and/or detecting any other user input, physical or otherwise. It is important to note that while some of the exemplary embodiments described in this description recite a button release or button press, any input steps that may signal or control transmitter device 102 to start or stop training may be used.

Figure 7:
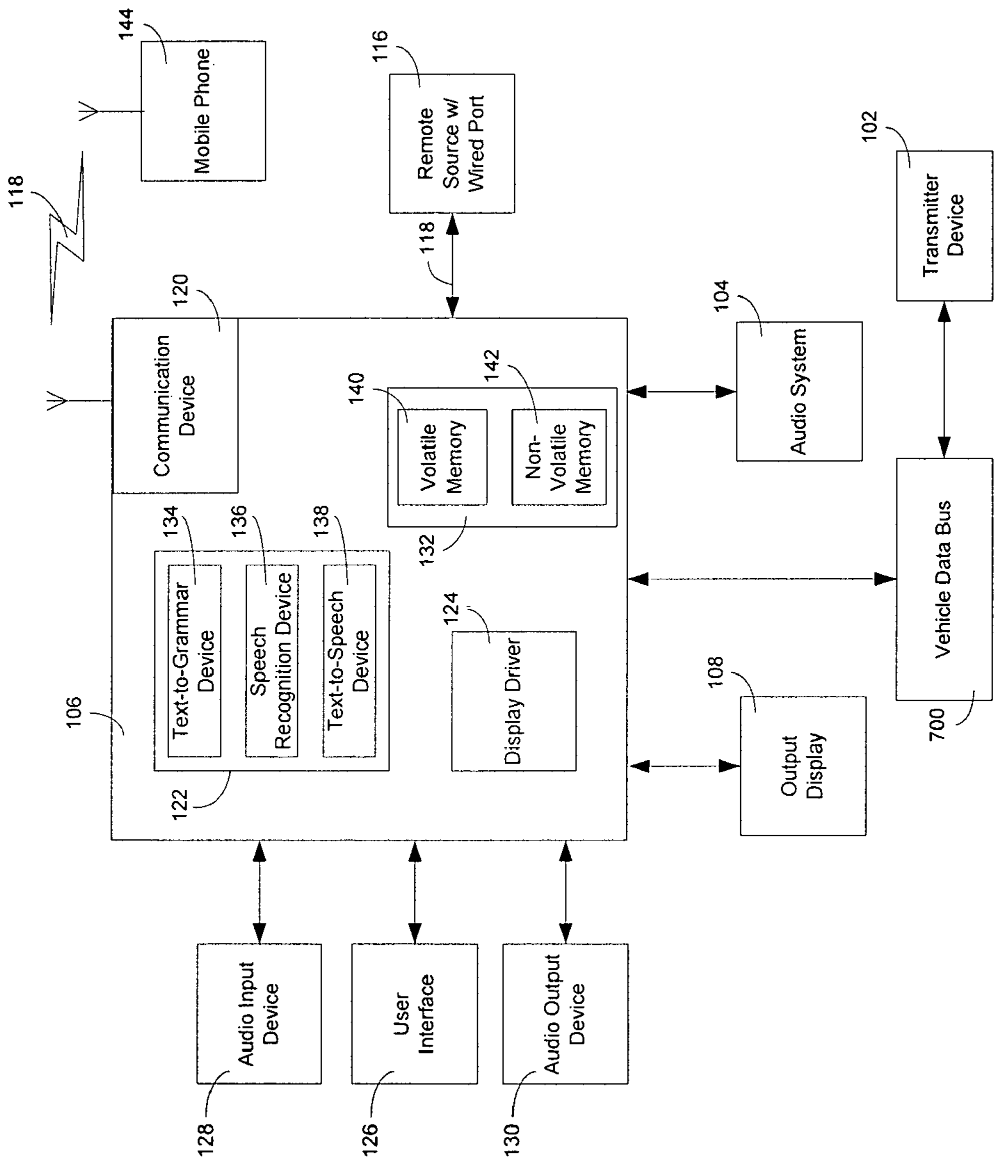
FIG. 7 is a block diagram of the transmitter device of FIG. 5 coupled to the in-vehicle control system of FIG. 1, according to an exemplary embodiment.

Referring to FIG. 7, according to an exemplary embodiment, control system 106 is shown connected to transmitter device 102. Transmitter device 102 is shown having an interface with vehicle data bus 700. Control system 106 may communicate via vehicle data bus 700 to transmitter device 102. According to various alternative embodiments, transmitter device 102 may be connected directly to control system 106 or may not be connected to control system 106 at all. When transmitter device 102 is connected to control system 106 (through vehicle data bus 700 or otherwise), control system 106 (and/or connected systems and devices) may be used to control the programming (training) of transmitter device 102. For example, speech recognition device 136 or buttons of control system 106 may be used to control transmitter device 102 during the training process or during normal operation.

Figure 8:
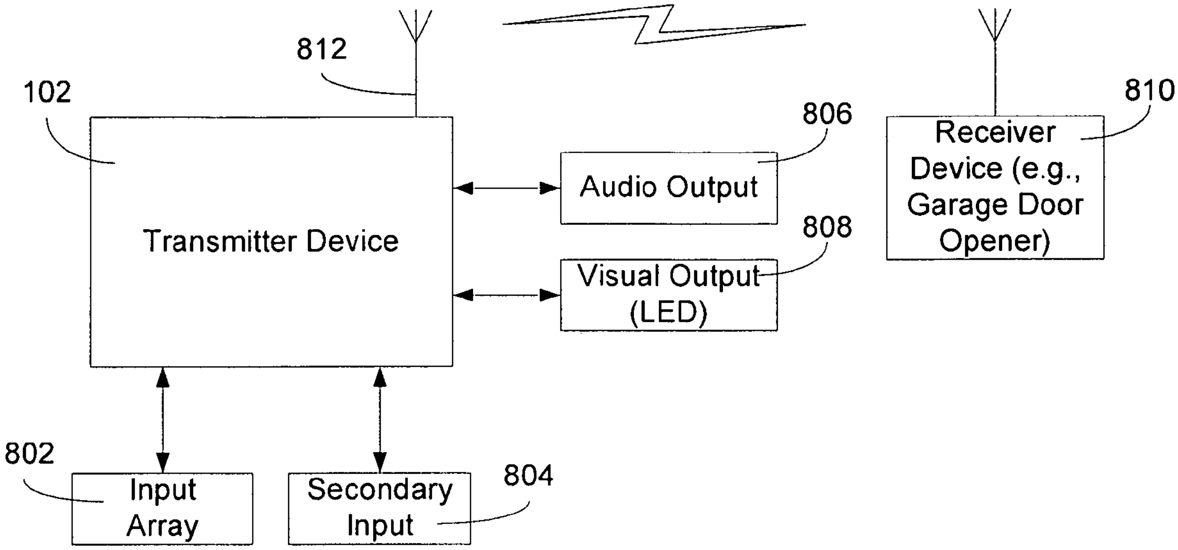
FIG. 8 is a block diagram of the transmitter device of FIG. 5, according to an exemplary embodiment.

Referring to FIG. 8, a block diagram of transmitter device 102 is shown, according to an exemplary embodiment. Transmitter device 102 may accept signals or input from a user input array 802 or from secondary input 804 (e.g., input from a primary in-vehicle control system, separate speech recognition device, secondary control system, steering wheel button, etc.). Transmitter device 102 may be connected to an audio output device 806 (e.g., a speaker) or a vehicle audio system. Transmitter device 102 may also include an operative connection to a visual output 808 (e.g., an LED). Visual output 808 may also be a display on the user dash, a display connected to the control system, or otherwise. Transmitter device 102 is also shown having an antenna 812. Antenna 812 may be internal a housing or external and may be located anywhere on the vehicle. Transmitter device 102 may be configured to send signals to a receiver device 810 (e.g., a garage door opener) using antenna 812.

Figure 9:
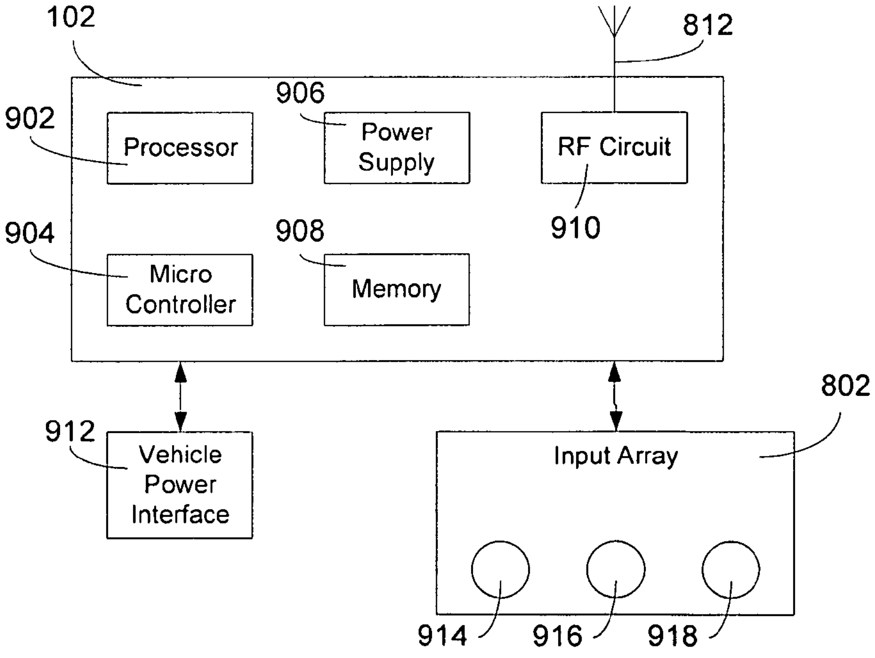
FIG. 9 is a block diagram of the transmitter device of FIG. 5, according to another exemplary embodiment.

Referring to FIG. 9, a block diagram of transmitter device 102 is shown. Transmitter device 102 may include a connection to a variety of user input arrays 914, 916, 918, and a vehicle power interface 912. According to other various embodiments, transmitter device 102 may be self-powered having a separate power supply 906 (e.g., one or more battery cells, etc.). According to other embodiments, transmitter device 102 may have both power supply 906 and vehicle power interface 912. Transmitter device 102 may have an antenna 812 and RF circuitry 910 (e.g., transmitting circuitry, receiving circuitry, transceiving circuitry, digital to analog circuitry, filtering circuitry, modulating circuitry, demodulating circuitry, etc.). Transmitter device 102 may also include a processor 902, a micro controller 904 (e.g., a second processor), a memory 908, and/or any other hardware or software components that may facilitate the activities of the transmitter device.

Figure 10:
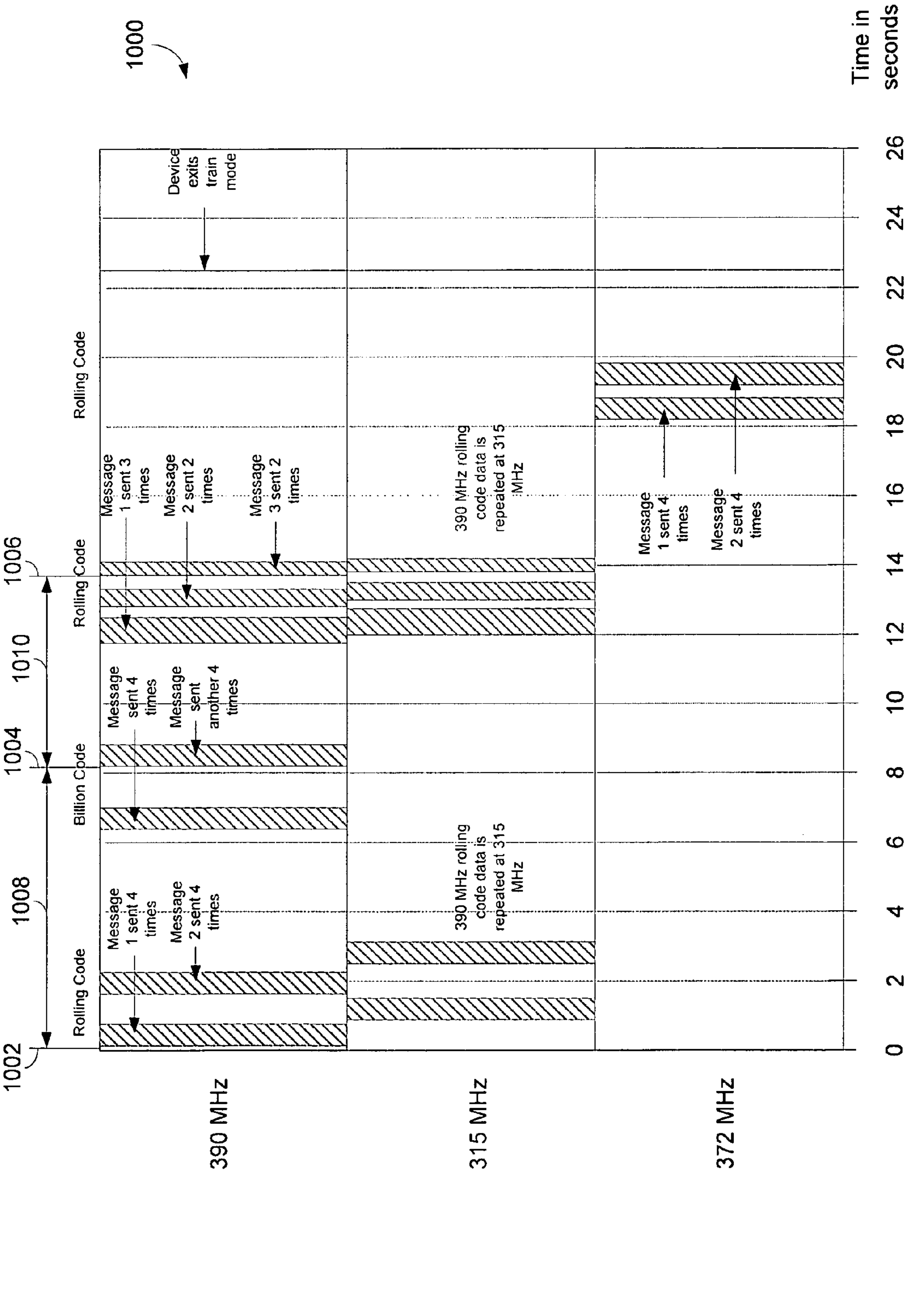
FIGS. 10, 11, and 12 are tables of various transmission codes for a receiver device such as a garage door opener, according to an exemplary embodiment.
Figure 11:
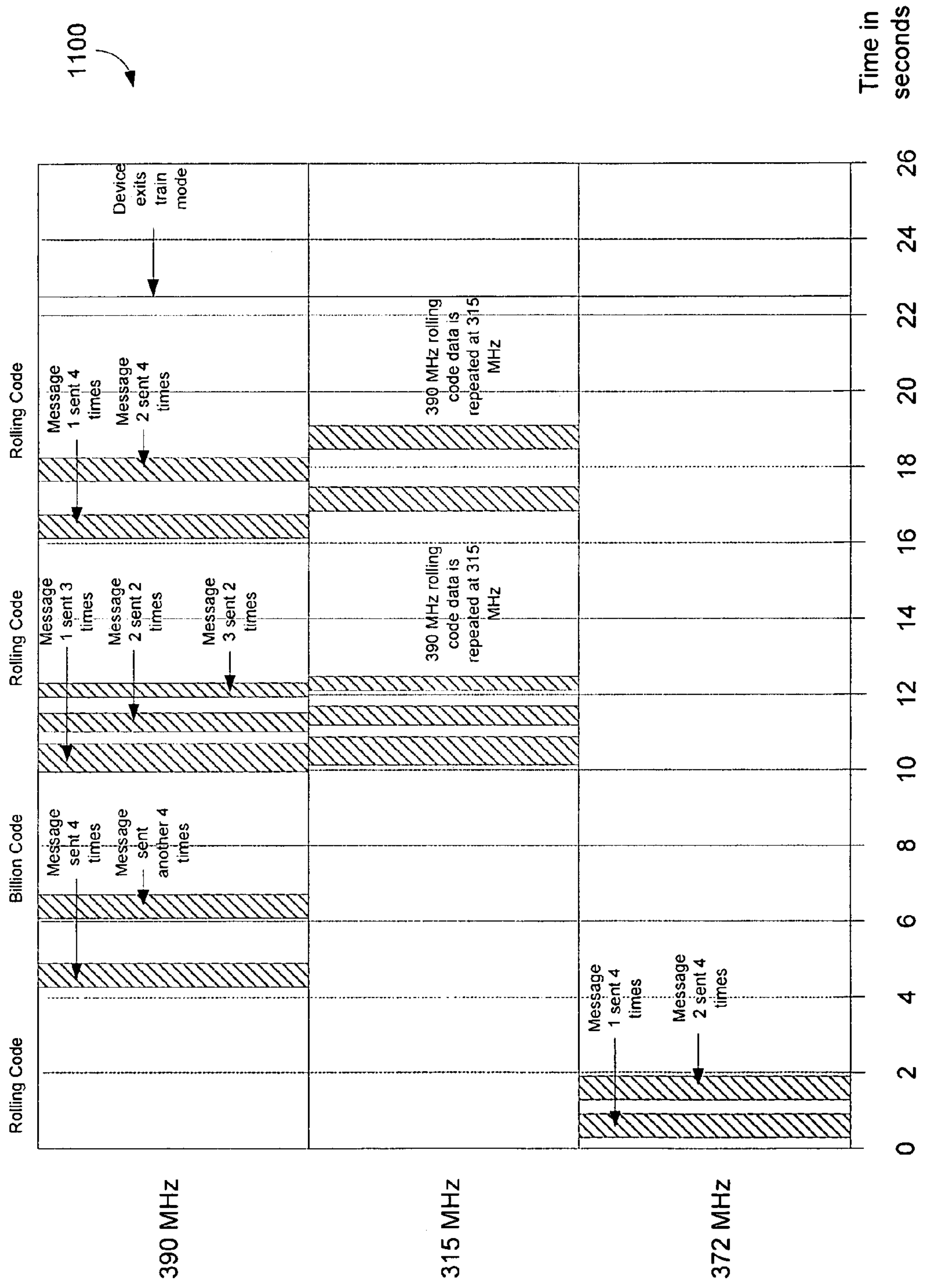

Referring to FIGS. 10 and 11, tables 1000, 1100 of various sequential transmissions configured to be transmitted from a transmitter device are shown, according to an exemplary embodiment. The sequential transmissions are shown as rolling code transmissions and/or billing code transmissions. Each transmission may include one or more messages or codes. The codes for the device may be of any dynamic type, rotating type, rolling code type, static type, billion code type, and/or combination of types. A transmitter device may begin a calibration or training process when a user presses and holds down a button associated with the transmitter device. During the training process, the transmitter device is configured to transmit a first transmission to a receiver device, a second transmission to a receiver device, and so forth. When the device (e.g., a garage door opener) changes state in response to a received transmission, the user is instructed to release the button. The transmitter device is then configured to correlate the button release with a transmission (e.g., the first or the second transmission).

Referring to FIG. 10, transmissions are shown at different frequencies (e.g., centered around different frequencies), according to an exemplary embodiment. Different receivers may expect to receive transmissions on different frequencies. For example, a first type or brand of receiver may expect data transmitted at 390 MHz and/or 315 MHz while a second type or brand of receiver may expect to receive data transmitted at 372 MHz. Similar transmissions may be sent from a transmitter device at multiple wavelengths to accommodate different receivers. A second transmission, perhaps according to a different code type (e.g., a billion code type) is transmitted at some time after the first transmission.

Using the 390 MHz transmission row for an example of potential delay between the beginning of a transmission attempt and the possible actuation of a garage door opener, if the receiver device requires two messages to be received and recognized for a transmission to change a receiving device state, the earliest a user might view state change (e.g., the garage door opening) might be at approximately one point five seconds after the button is first pressed, or just after the second message of the first 390 MHz transmission is received.

The second transmission is shown to begin at around six point two seconds after the button is pressed. While conventional systems may close the first training window at six seconds, according to an exemplary embodiment where the first training window is extended, the user has until the second transmission is transmitted a second time, just after eight seconds after the button is pressed, to release the button and store the first code (this time frame is illustrated by time frame 1008 marked by beginning time 1002 and ending time 1004).

Another time frame 1010 is shown to extend from the time 1004 the second transmission may be recognized by the receiving device to a time 1006 that a third transmission may be recognized by the receiving device.

Figure 12:
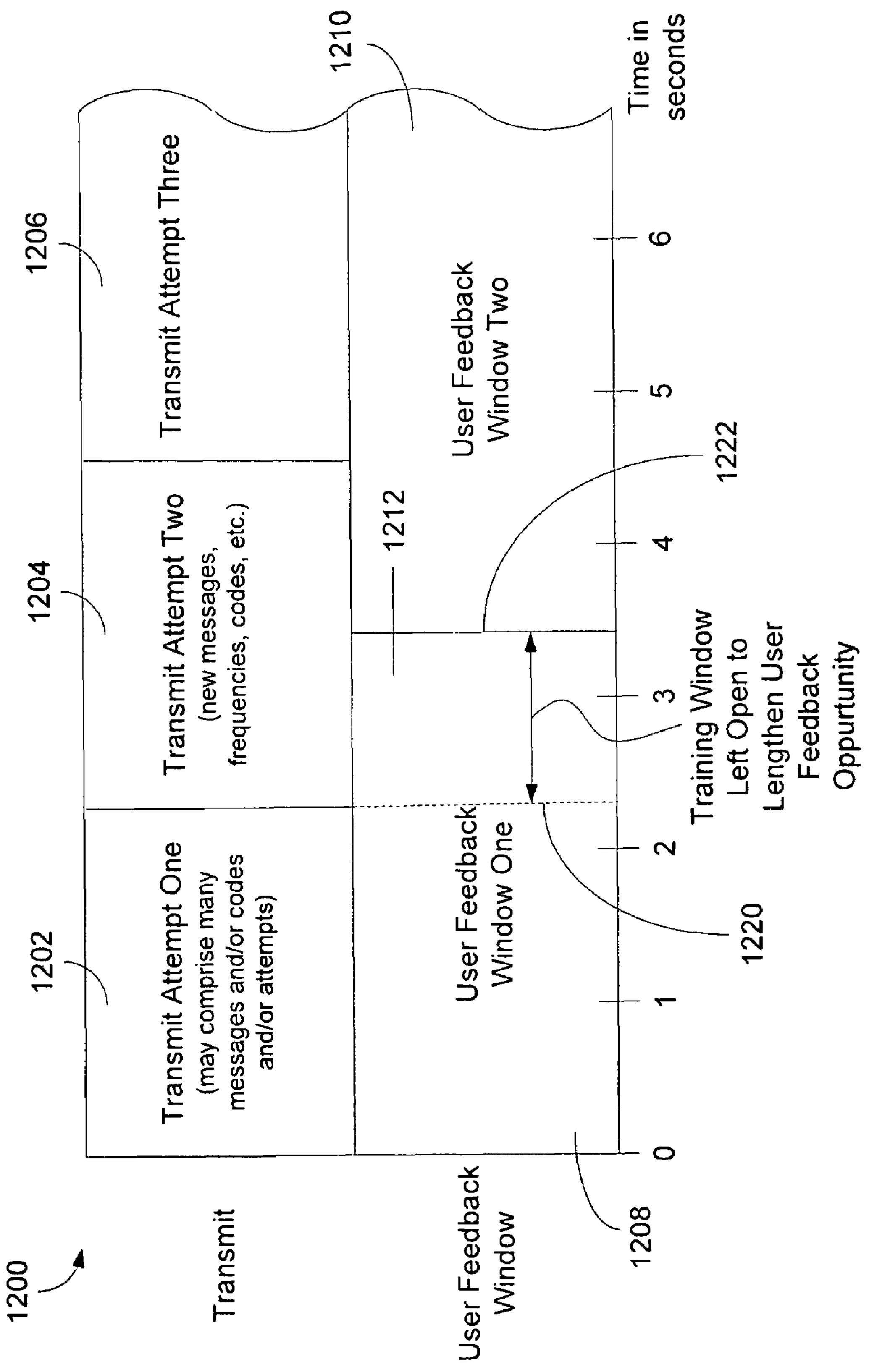

As shown in FIG. 12 by table 1200, an exemplary scheme for extending user feedback windows is shown, according to an exemplary embodiment. Multiple transmit attempt windows 1202, 1204, 1206 represent three windows in which a different transmission will be sent from a transmitter device to a receiver device. The transmissions may include one or more messages and/or codes. User feedback windows 1208 and 1210 are also illustrated. Users feedback windows 1208 and 1210 are windows within which the user may indicate that the receiving device has changed state. Portion 1212 of user feedback window 1208 is shown as an extended period of time (from the time illustrated by line 1220 to the time illustrated by line 1222) during which a user feedback window for the first transmission 1202 is still available. According to an exemplary embodiment, a second transmission 1204 has begun while the first user feedback window 1208 remains open. By way of further example, if a user provides feedback during extended portion 1212 of window 1208, the transmitter device will configure itself according to first transmission 1202 rather than transmission 1204.

Figure 13:
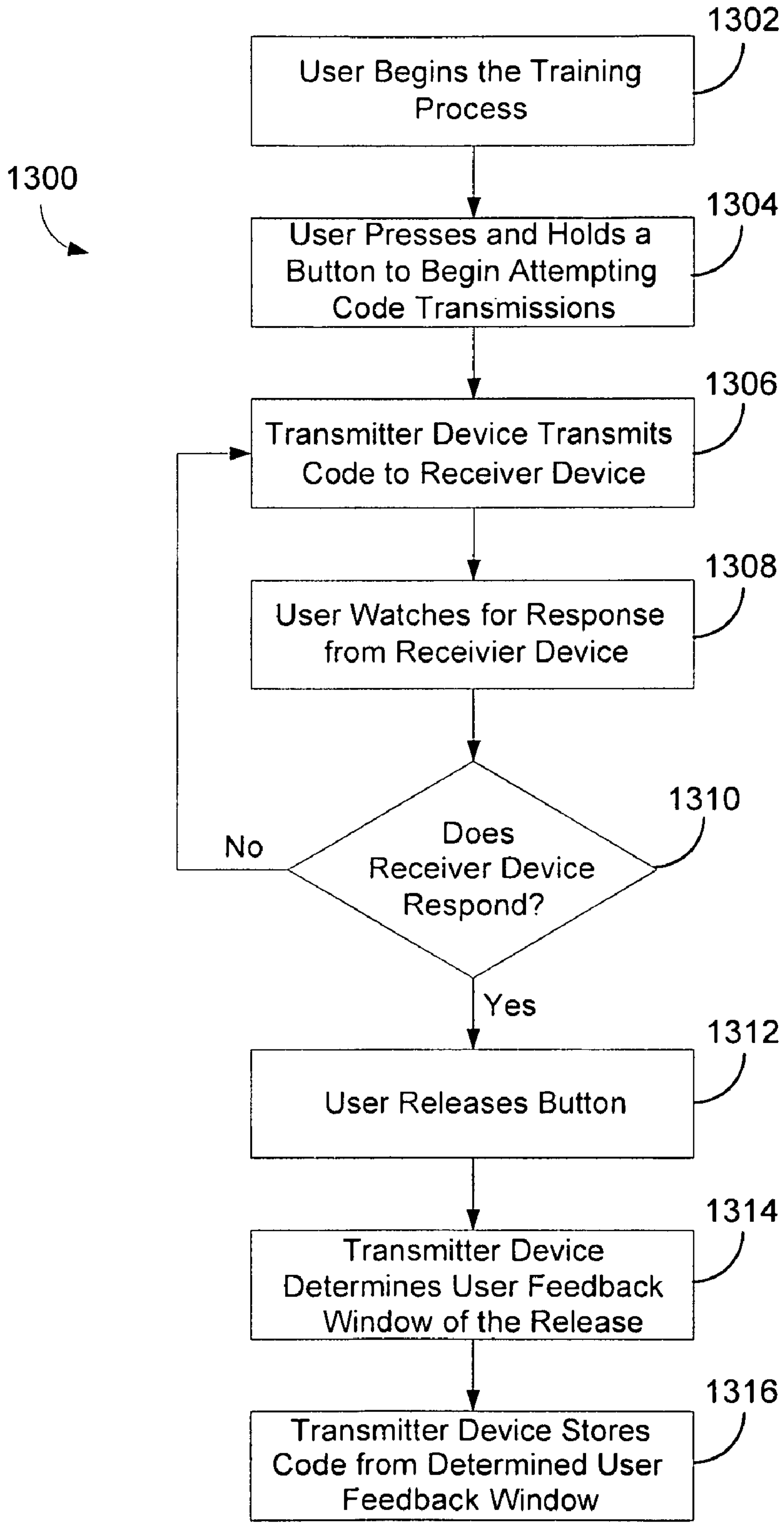
FIG. 13 is a flowchart of a process for training a transmitter device, according to an exemplary embodiment.

Referring to FIG. 13, a flowchart of a process 1300 for training a transmitter device is shown according to an exemplary embodiment. A user may begin the training process (step 1302) with a voice command, a button press or other input. A user holds down a button on the transmitter device to begin a first transmission (step 1304). This transmission is sent to the receiver device (step 1306) and the user may watch for whether the receiver device responds (e.g., a garage door opens or closes, etc.) (step 1308). If the user sees the receiver device respond (step 1310), the button is released (step 1312). The transmitter device may then determine which user feedback window the button was released within (step 1314) and stores the corresponding transmission parameters (e.g., transmission code, code type, frequency, receiving device type, etc.) (step 1316). The step of determining which user feedback window the button was released within (step 1314) may include a process that extends the training window beyond the beginning of the next transmit attempt. See, for example, the extended training window of FIGS. 10 and 12. The transmitter device may determine that a training input (e.g., a button release) occurred after the second transmit attempt had begun, for example, but before a first user feedback window had closed, and correlate or store the first transmission for later transmission.

The size of the user feedback window may be determined and/or used in a variety of ways. According to an exemplary embodiment, the size of the user feedback window may be adjusted dynamically based on digital and/or analog signal processing technology of the transmissions (or a precursor thereof), may be preprogrammed with a standard time that extends into subsequent transmissions, or user feedback window sizes may be preassociated with transmission sequences. For example, the manufacturer of the transmitter device may preprogram each user feedback window to extend the user feedback window into the next transmission but not to interfere with the ability of the next transmission to be properly trained. The process may take any number of additional steps, including, for example, associating a button or other vehicle user interface element with the stored code.

Figure 14:
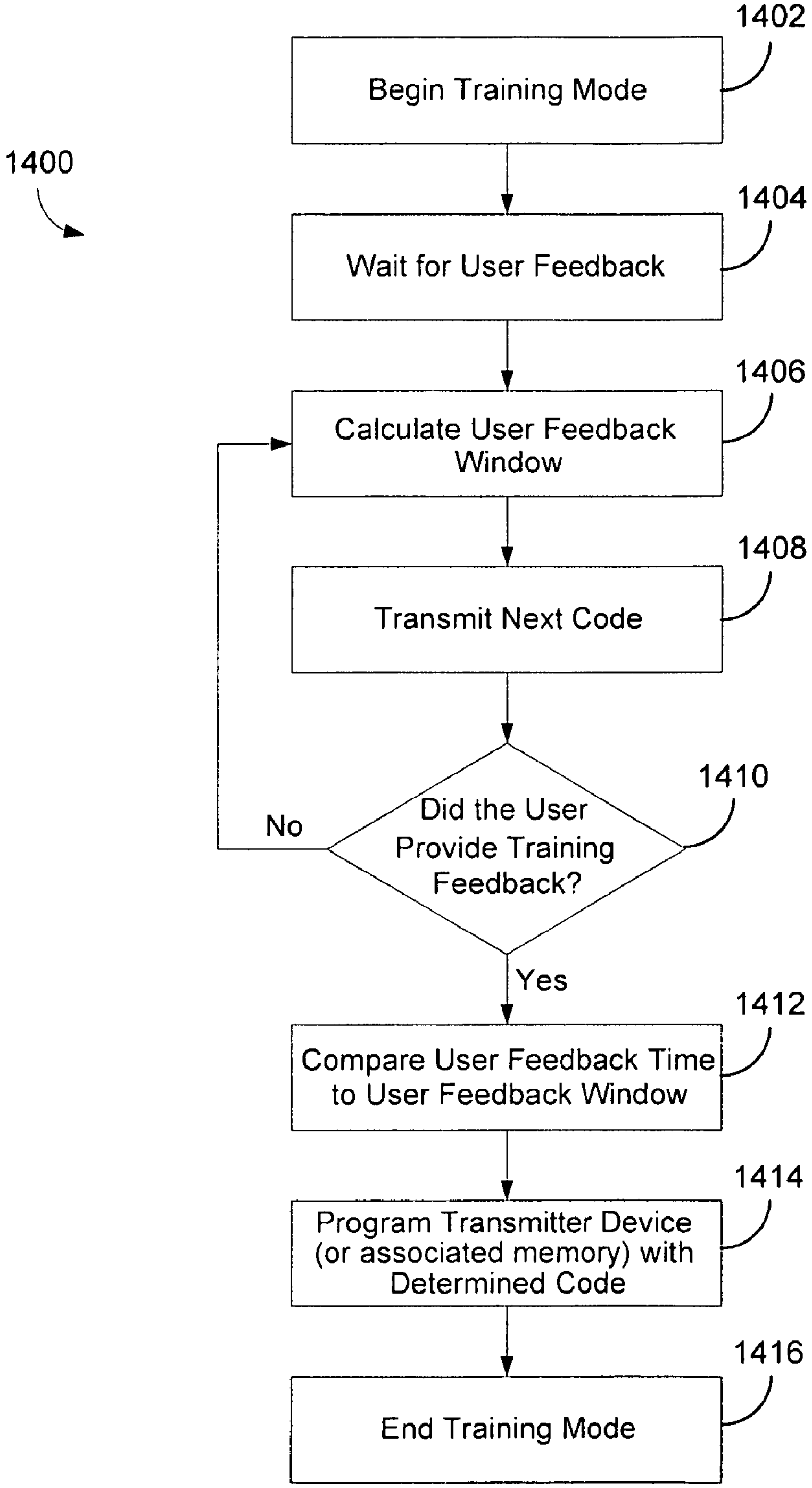
FIG. 14 is a flowchart of a process for using a transmitter with an extended training window, according to an exemplary embodiment.

Referring to FIG. 14, a flowchart of a process 1400 for configuring a transmitter device is shown, according to another exemplary embodiment. A transmitter device begins a training mode (step 1402) and waits for a user input (e.g., a user input signal, a signal resulting from the actuation of a user interface element) (step 1404) before transmitting to a receiver device. The transmitter device may calculate a user feedback window for a first code (step 1406) prior to (or during) the transmission of the first code (step 1408). The transmitter device may then wait for a user feedback signal (e.g., the release of a button, etc.) (step 1410). If a user feedback signal is not received then the transmitter device continues transmissions (step 1406 and 1408). If the transmitter device receives a user feedback signal the device compares the time of the user feedback to the calculated user feedback window (step 1412). The transmitter (or associated memory) is then programmed (e.g., configured, adjusted, etc.) with the code associated with the user feedback window during which the user feedback signal was received (step 1414). The step of comparing the time of the user feedback signal to a calculated user feedback window (step 1412) may include any number of sub-steps. For example, the transmitter device may attempt to determine which user feedback window likely corresponds to the received user input signal from the user. These sub-steps may further include determining the an optimal size of a user feedback window based on knowledge of the beginning of the next transmission or the beginning of the next transmission that might cause the receiving device to change state. After programming the transmitter device with the determined code, the process ends (step 1416).

Figure 15A:
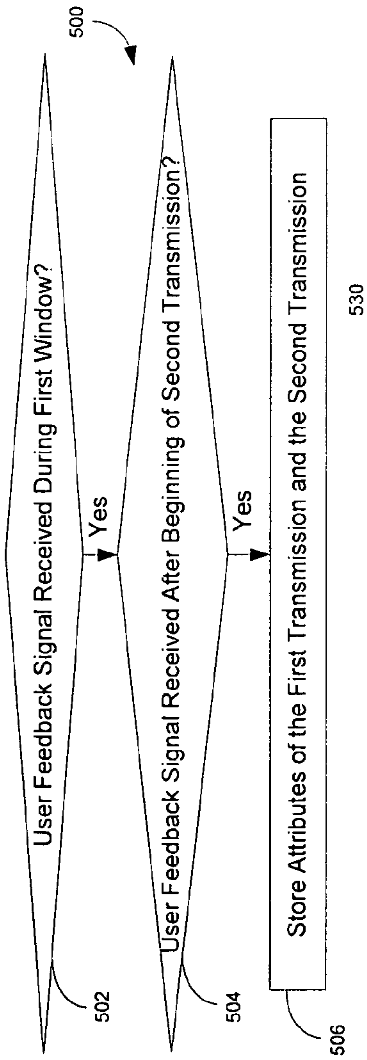
FIG. 15A is a flowchart of a process for storing attributes of both a first transmission and a second transmission, according to an exemplary embodiment.

Referring now to FIG. 15A, a flow chart of a process 500 is shown, according to an exemplary embodiment. Process 500 is a possible process for a transmitter device when user feedback is received in a first user feedback window but the user feedback is received after the beginning of the second transmission. Process 500 is shown to include the step of determining whether a user feedback signal was received during a first user feedback training window (step 502). Process 500 is further shown to include the step of determining whether a user feedback signal was received after beginning the second transmission (step 504). If steps 502 and 504 result in positive determinations, the system may be configured to store attributes of the first transmission and the second transmission (step 506). It is important to note that any number of steps might conducted in addition to or in place of steps 502 and 504. For example, logic may be included that stores attributes of the first transmission and the second transmission if the user feedback signal is detected within one second, two second, or some other time between a user feedback window edge. Storing attributes for adjacent transmissions may result in the system being able to conduct further training activities during the normal operation of the transmitter device. The transmitter may also use similar logic to ensure that the user need not restart the training process because he or she released the button a little late (or early).

Figure 15B:
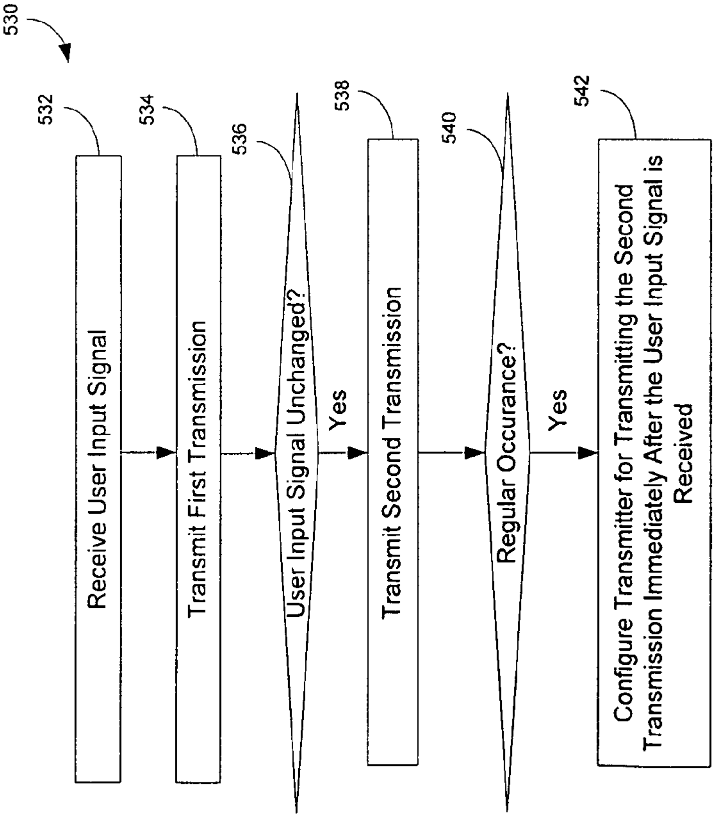
FIG. 15B is a flowchart of a process for sending the transmissions configured in 15A and for reconfiguring the transmitter based on user activity, according to an exemplary embodiment.
Figure 15C:
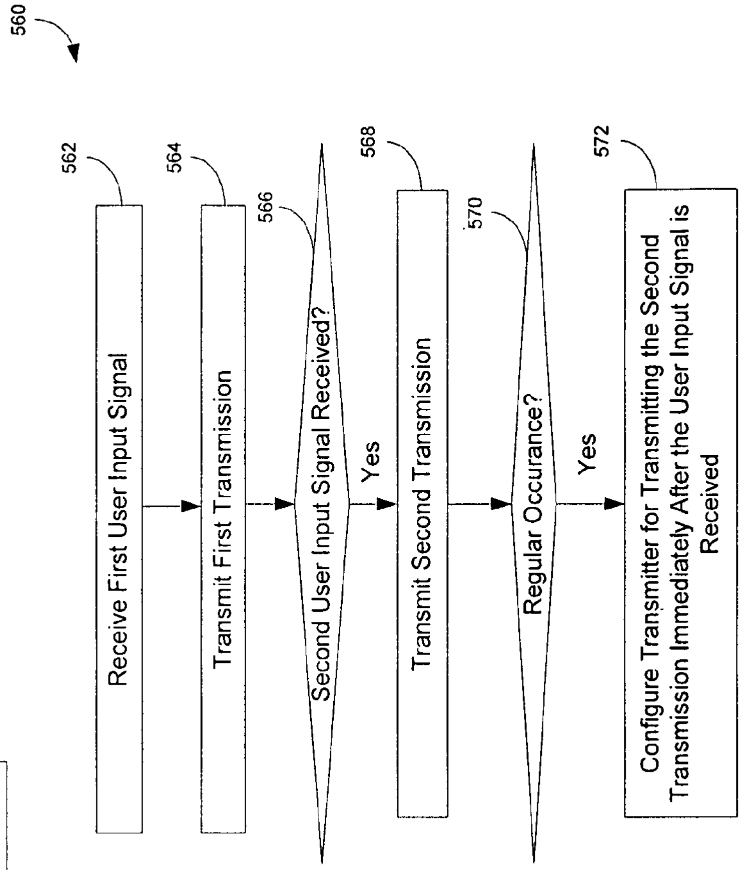
FIG. 15C is a flowchart of a process for sending the transmissions configured in 15A and for reconfiguring the transmitter based on user activity, according to another exemplary embodiment.

Further to FIG. 15A, FIGS. 15B and 15C are provided for using the two stored attribute sets of the first transmission and the second transmission. Process 530 of FIG. 15B includes the steps of receiving a user input signal (step 532) and transmitting the first transmission (step 534). Process 560 of FIG. 15C includes similar steps 562 and 564. Process 530 includes the step of determining whether the user input signal is unchanged (step 536). If the user input signal is unchanged (e.g., if the user has not released a button, etc.) the system may transmit the second transmission (step 538). The system may include logic (and/or memory, counters, etc.) to determine whether the system being caused to transmit the second transmission (in addition to the first transmission) is a regular occurrence (step 540). If the occurrence is regular, the system may then configure the transmitter for transmitting the second transmission immediately after the user input signal is received (e.g., changing the order of the first transmission and the second transmission). So, for example, if the second transmission is actually the transmission that causes the receiving device to change states, the transmitter will be reprogrammed (based on user habit, knowledge of regular user activity, etc.) to transmit the second transmission first. According to various alternative embodiments, step 542 may include configuring the transmitter so that it no longer transmits the first transmission and only transmits the second transmission. FIG. 15C and process 560 illustrate a similar activity having steps 568, 570 and 572 which may be similar or different from the steps of process 530. According to the embodiment shown in process 560, however, the system checks for whether a second user input signal is received (step 566). If a second user input signal is received, the system may determine that the first transmission was not successful and that it should try the second transmission (step 568). If the second transmission is requested by the user one or more times (or is a regular occurrence), the system may configure the transmitter device for transmitting the second transmission immediately after the first user input signal is received.

While the exemplary embodiments illustrated in the Figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system.

It is important to note that the construction and arrangement of the systems and devices as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., control system, memory device, communications device, data processing device, remote source, remote server, home control device, transmitting device, receiving device, etc.), the position of elements may be reversed or otherwise varied (e.g., the components of control system, home control device, etc.), and the nature or number of discrete elements or positions may be altered or varied (e.g., communications device, memory device, the components of control system, etc.). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The invention claimed is:

1. A system for mounting in a vehicle including a user interface element and for causing a receiver device to change states, the system comprising:

a transmitter;

a memory unit; and an interface for receiving a user feedback signal from the user interface element;

wherein the system is configured to cause the transmitter to transmit a first transmission followed by a second transmission; and wherein the system is configured to associate a first user feedback time window with the first transmission and a second user feedback time window with the second transmission, the first user feedback time window extending to a time after the transmitter has begun transmitting the second transmission;

wherein the system is further configured to associate the user feedback signal with the first transmission when the user feedback signal is received during the first user feedback window; and wherein the system is further configured to associate the user feedback signal with the second transmission when the user feedback signal is received during the second user feedback window; and wherein the system is configured to store a representation and/or an attribute of the first transmission or the second transmission in the memory based on which transmission has been associated with the user feedback signal.

2. The system of claim 1, further comprising a circuit for controlling the transmitter.

3. The system of claim 2, wherein the circuit is a microcontroller or processor.

4. The system of claim 1, wherein the first user feedback window extends to a time prior to a time at which the receiving device may first change states based on the second transmission.

5. The system of claim 1, wherein the second transmission includes a first message and a second message, wherein the receiver device is configured to receive both the first message and the second message prior to changing states, and wherein the first user feedback training window extends through the first message.

6. The system of claim 1, wherein the second transmission includes a first message and a second message, wherein the receiver device is configured to receive both the first message and the second message prior to changing states, and wherein the first user feedback training window extends through the first message and ends prior an end of the second message.

7. The system of claim 1, wherein the second transmission includes a first message and a second message, wherein the receiver device is configured to receive both the first message and the second message prior to changing states, and wherein the first user feedback training window extends through the first message and ends prior a beginning of the second message.

8. The system of claim 1, wherein the second transmission includes a first message and a second message, wherein the receiver device is configured to receive both the first message and the second message prior to changing states, and wherein the first user feedback training window extends through the first message and ends while the second message is transmitting.

9. A method for configuring a transmitter device to transmit a recognized transmission to a receiving device, the method comprising:

transmitting a first transmission;

transmitting a second transmission after the first transmission;

receiving, during the second transmission, a user input signal from an interface for receiving signals from one or more user interface elements;

storing an attribute associated with the second transmission in a memory device in response to the user input signal;

calculating a first user feedback window associated with the first transmission, the first user feedback window extending into a time beyond a beginning of the second transmission;

storing an attribute associated with the second transmission in response to the user input signal and configuring a logic element to transmit the first transmission and the second transmission when a second user input signal is received; and determining whether the first transmission or the second transmission changed the state of the receiving device based upon user input activity occurring subsequent to the receipt of the second user input signal.

* * * * *